March 18, 1924.

H. P. REED 1,487,697

CONTROLLER FOR ELECTRIC MOTORS

Filed April 10, 1922  2 Sheets-Sheet 1

INVENTOR.
Harrison P. Reed
BY
ATTORNEY.

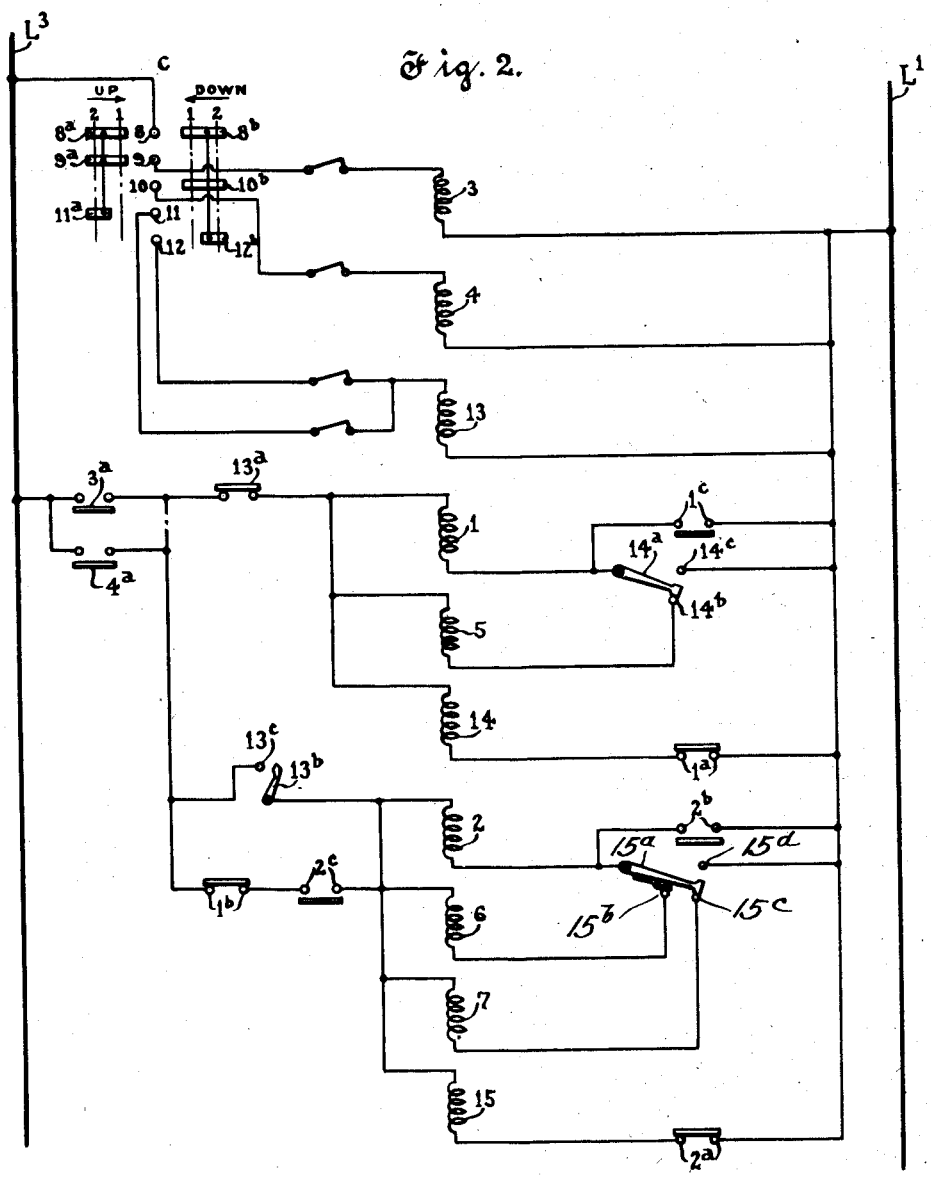

Patented Mar. 18, 1924.

1,487,697

UNITED STATES PATENT OFFICE.

HARRISON P. REED, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLER FOR ELECTRIC MOTORS.

Application filed April 10, 1922. Serial No. 550,969.

*To all whom it may concern:*

Be it known that I, HARRISON P. REED, a citizen of the United States, residing at Milwaukee, in the county of Milwaukee and State of Wisconsin, have invented new and useful Improvements in Controllers for Electric Motors, of which the following is a full, clear, concise, and exact description, reference being had to the accompanying drawing, forming a part of this specification.

This invention relates to controllers for electric motors and more particularly to controllers for two speed A. C. motors.

While not limited thereto the present invention is especially applicable to controllers for that type of two speed A. C. motor having separate slow speed and high speed primary windings and a squirrel cage secondary.

In practice, as in elevator service, it frequently is desired to control a two speed motor through the medium of a control instrumentality having a slow speed position through which it must be passed to obtain high speed or otherwise designed with a resulting tendency to connect the motor for slow speed prior to connection thereof for high speed. On the other hand it has been found that in some instances a satisfactory start may be made on high speed and in such instances it is desired to insure against even momentary establishment of the slow speed connections incident to starting.

Starting on high speed when permissible is very advantageous and the present invention has among its objects to provide a controller of the aforementioned character with means enabling such starting without prior establishment of slow speed connections.

Another object is to provide a controller to so function in response to a simple movement of the control instrumentality from its neutral position to its high speed position, the establishment of slow speed connections requiring an appreciable pause in the movement of such instrumentality.

Another object is to provide a controller of the aforementioned character wherein return of the control instrumentality effects establishment of the slow speed connections prior to interruption of the high speed connections, thereby effecting a gradual slow down with continuity of torque.

Other objects and advantages of the invention will hereinafter appear.

The accompanying drawing illustrates one embodiment of the invention now to be described, it being understood that the invention may be embodied in other forms falling within the scope of the appended claims and that certain features of the invention are applicable to types of motors other than that illustrated.

In the drawing,

Fig. 2 is an across-the-line diagram of the control circuits.

Figure 1:
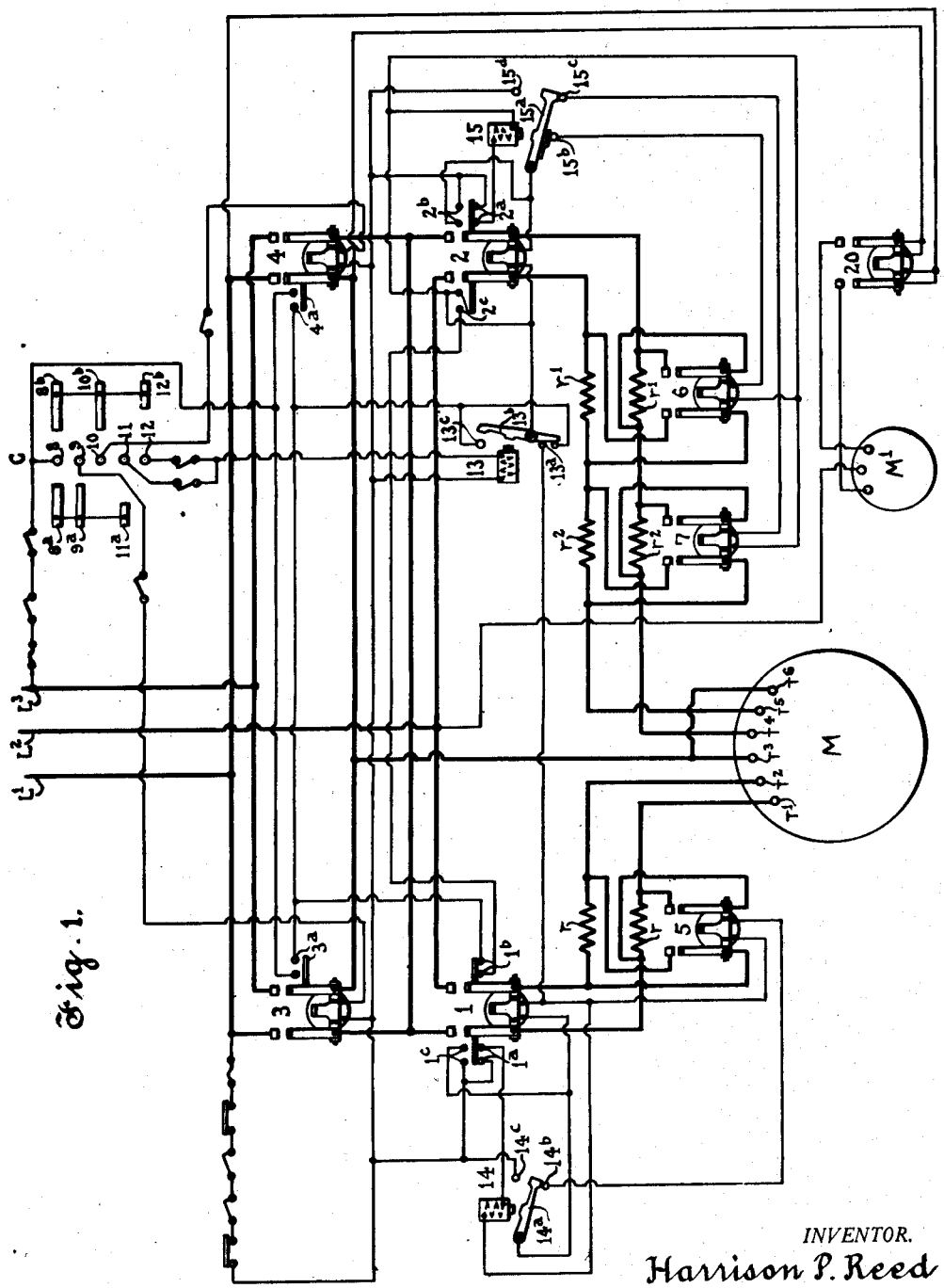
Fig. 1 is a diagrammatic view of the controller connected to a motor.

Referring to Fig. 1 of the drawings the same illustrates a controller in connection with a three phase motor M having separate slow speed and high speed primary windings and a squirrel cage secondary. The terminals of the slow speed primary winding are designated as $T'$ to $T^3$, while those of the high speed secondary are designated as $T^4$ to $T^6$.

The controller comprises electro-responsive switches 1 and 2 to control the circuits of the slow speed and high speed windings selectively and reversing switches 3 and 4 common to the circuits of said windings. Also the controller includes an electro-responsive switch 5 to control resistances $r$ provided in two phases of the circuit of the slow speed winding and electro-responsive switches 6 and 7 to control resistances $r'$ and $r^2$ provided in two phases of the circuit of the high speed winding.

As will be apparent from Fig. 1 the aforementioned switches control the heavy line circuits, the switches 1 and 3 co-operating to establish a connection from terminal $T'$ of the motor through one resistance $r$ to line $L'$ while switch 1 alone connects motor terminal $T^2$ through the other resistance $r$ to line $L^2$ and switch 3 alone connects motor terminal $T^3$ to line $L^3$. Alternatively switches 1 and 4 serve to connect motor terminal $T'$ through one resistance $r$ to line $L^3$ while switch 4 alone connects the motor terminal $T^3$ to line $L'$. On the other hand switches 2 and 3 jointly connect motor terminal $T^4$ through one set of resistances $r'$ and $r^2$ to line $L'$ while switch 2 alone connects motor terminal $T^5$ through the other set of resistances $r'$ and $r^2$ to line $L^2$ and switch 3 alone connects motor terminal $T^6$ to line $L^3$. Alternatively switches 2 and 4 jointly connect motor terminal $T^4$ through the aforementioned resistances to line $L^3$ while switch 4 alone connects motor terminal $T^6$ to line $L'$. The switch 5 through its left hand set of contacts short-circuits the upper resistance $r$ and through its right hand contacts short-circuits the lower resistance $r$ while the switches 6 and 7 function similarly with respect to their resistances $r'$ and $r^2$.

The aforementioned switches thus provide for operation of the motor in either direction and at either slow speed or high speed providing one step of acceleration in slow speed operation and two steps of acceleration in high speed operation.

A master controller C is provided to control the reversing switches directly and to control the remaining switches through the medium of relays to determine the direction and speed of operation of the motor. This master switch, which for convenience is shown as of the drum type, comprises a series of contacts 8 to 12 and two sets of cooperating segments $8^a$, $9^a$, $11^a$ and $8^b$, $10^b$, $12^b$ arranged to afford two operative positions to the right and left of an intermediate neutral position. When moved in either direction to its first position the controller energizes one or the other of the reversing switches according to its direction of movement and completes the circuits of certain of the relays hereinafter set forth to effect through response thereof energization of the slow speed switch 1. On the other hand upon continued movement of the master controller in either direction the same effects, through the medium of certain of such relays, response of the high speed switch 2 and prevents response of the slow speed switch 1 if such continued movement is effected without appreciable pause in the first position.

More specifically the switches 1 and 2 have associated therewith a so-called transfer relay 13 normally positioned to interrupt the circuit of the high speed switch 2 and responsive to complete said circuit and interrupt the circuit of the slow speed switch 1. This relay is energizable directly by the master controller when moved in either direction to its second operative position and is designed for quicker response than the switch 1 with a consequent tendency to defeat response of the latter switch if the master controller is moved quickly to its second operative position. Moreover the switch 1 has associated therewith a relay 14 normally interrupting the circuit thereof and hence requiring energization prior to response of said switch 1, whereas said relay 14 is also under the control of the transfer relay 13 and is de-energized by response of said relay. Accordingly if the transfer relay 13 responds prior to full response of relay 14 which is energized in either of the first operative positions of the master controller it will de-energize said relay thereby preventing response of the slow speed switch 1 and as will be apparent this arrangement necessitates a very appreciable pause of the master controller in its first operative position to effect response of the slow speed switch.

The relay 14 is also utilized to control the accelerating switch 5, said relay being de-energized upon response of switch 1 and upon its return movement effecting energization of said accelerating switch. The high speed switch 2 also has associated therewith a similar relay 15 which must be energized prior to response of said switch and which in turn is de-energized by response of switch 2 to effect energization of switches 6 and 7 sequentially upon its return movement.

The high speed switch 2 is maintained energized independently of the transfer relay 13 through down contacts on the slow speed switch 1 as hereinafter set forth. Accordingly return of the master controller from either of its second operative positions to the corresponding first position releases the transfer relay 13 without effecting the high speed switch 2 and said relay upon release effects energization of switch 1 as heretofore set forth. Accordingly in slowing down the slow and high speed switches are both closed for a brief period, the slow speed switch 1 upon closure acting through its down contacts to de-energize the high speed switch 2, whereby the slow speed winding is reconnected in circuit for slow down without interruption of the power supply to the motor.

The switch 1 has three sets of auxiliary contacts $1^a$, $1^b$ and $1^c$, the sets of contacts $1^a$ and $1^b$ being respectively bridged in normal position of said switch while the contacts $1^c$ are bridged upon response of said switch. The switch 2 has sets of auxiliary contacts $2^a$, $2^b$ and $2^c$, the contacts $2^a$ being bridged in the normal position of said switch and the sets of contacts $2^b$ and $2^c$ being respectively bridged upon response of said switch. The switch 3 has a set of auxiliary contacts $3^a$ to be bridged upon response of said switch and the switch 4 has a similar set of auxiliary contacts $4^a$. The relay 13 has a set of contacts $13^a$ to be bridged in the normal position of said switch and a contact arm $13^b$ to engage a contact $13^c$ upon response of said switch. The relay 14 has a contact arm $14^a$ normally engaging a contact $14^b$ and adapted upon response to engage a contact $14^c$. The relay 15 has a contact arm $15^a$ adapted in normal position to engage contacts $15^b$ and $15^c$ and upon response of said switch to engage a contact $15^d$. The relay 15 is preferably so designed as to cause the arm $15^a$ to engage the contacts $15^b$ and $15^c$ sequentially and both relays 14 and 15 are in practice preferably provided with means for retarding the descent of their respective contact arms to afford time elements incident to energization of the accelerating switches controlled thereby.

While the control circuits shown in Fig. 1 are believed to be obvious, they have been illustrated in simplified form in Fig. 2 which shows the master controller and all of the relay windings and interlocking contacts above specified. Referring to this figure, it will be observed that the contact 8 of the master controller is connected to line $L^3$ exclusive of the fuse and safety switches shown in Fig. 1 and that a point X common to all the control circuits is connected to line $L'$ exclusive of the fuse, safety switches, etc., shown in Fig. 1.

Assuming movement of the master controller to its first up position circuit may be traced from line $L^3$ to contact 8 and thence through segments $8^a$ and $9^a$ to contact 9 thereby connecting the winding of reversing switch 3 across lines $L^3$ and $L'$. Switch 3 upon responding bridges its auxiliary contacts $3^a$ thereby connecting the winding of relay 14 across lines $L^3$ and $L'$ through the contacts $13^a$ of the transfer relay and the down contacts $1^a$ of the slow speed switch. The relay 14 thus responds causing its arm $14^a$ to engage contact $14^c$ thereby paralleling the winding of switch 1 with the winding of relay 14. This provides for energization of the slow speed switch 1, assuming retention of the master controller in its first position, and said switch upon responding disengages its auxiliary contacts $1^a$ thereby de-energizing relay 14 and causing its arm to re-engage contact $14^b$. This connects the winding of accelerating switch 5 in parallel with the winding of switch 1 through the now bridged auxiliary contacts $1^c$ of switch 1, the latter contacts also establishing a maintaining circuit for switch 1 independent of relay 14.

Assuming the master controller to be moved to its second up position, circuit is completed from line $L^3$ to contact 8 through segments $8^a$ and $11^a$ to contact 11, thereby connecting the winding of the transfer relay 13 across lines $L^3$ and $L'$. The transfer relay is thus energized to break circuit between its down contacts $13^a$ and to engage its contacts $13^b$ and $13^c$. The contacts $13^a$ thus serve to de-energize the slow speed switch 1 and accelerating switch 5 while the contacts $13^b$ and $13^c$ connect the winding of relay 15 across the line through the down contacts $2^a$ of the high speed switch 2.

The relay 15 is thus rendered responsive to engage its arm $15^a$ with contact $15^d$ thus connecting the winding of the high speed switch 2 in parallel with the winding of relay 15. The switch 2 then responds acting through the medium of its auxiliary contacts $2^b$ to establish a maintaining circuit for itself shunting the relay contacts $15^a$ and $15^d$ and acting through its auxiliary contacts $2^a$ to de-energize the relay 15. Thereupon the arm $15^a$ of the relay sequentially engages contacts $15^b$ and $15^c$ to connect the windings of accelerating switches 6 and 7 sequentially in parallel with the winding of switch 2.

Assuming operation of the master switch to its down positions circuit is completed from contact 8 through segments $8^b$ and $10^b$ to contact 10 thereby connecting the winding of reversing switch 4 across lines $L^3$ and $L'$. Switch 4 in responding bridges its auxiliary contacts $4^a$ which parallels the auxiliary contacts $3^a$ of reversing switch 3 and thus provides for establishment of the circuits above described for operation of the motor at either slow speed or high speed in the reverse direction.

Assuming the motor to be in operation in either direction at high speed the auxiliary contacts $2^c$ of the high speed switch 2 will be bridged and said contacts jointly with the down contacts $1^b$ of slow speed switch 1 will shunt the contacts $13^b$ and $13^c$ of the transfer relay thereby maintaining the circuit of the high speed switch when the master controller is returned to either of its first operative positions. As will be apparent when the master switch is so operated it will effect de-energization of the transfer relay 13 to re-establish through its contacts $13^a$ the circuits of the windings of relay 14 and slow speed switch 1 as already described. Thus the slow speed switch is reclosed while the high speed switch remains closed but upon closure of the former its auxiliary contacts $1^b$ are disengaged to interrupt the maintaining circuit of the high speed switch 2 which thereupon opens.

As will be understood the switches shown in Fig. 2 which have not been designated by reference characters comprise the usual safety switches, etc. Also as will be understood the motor M' shown in Fig. 1 is provided for operation of a suitable brake said motor being controllable by a switch 20 in turn controlled by the reversing switches to be energized when either reversing switch is closed to thereby effect brake releasing operation of motor M' and to be de-energized for setting of the brake when both reversing switches open.

What I claim as new and desire to secure by Letters Patent is:

1. In a controller for two speed A. C. motors, the combination with means to establish slow speed and high speed connections, including a master controller tending to effect establishment of such connections progressively, of means associated with the former means to necessitate an appreciable pause of said master controller in its slow speed position to effect establishment of slow speed connections whereby said master controller may be operated to effect starting by establishment of either slow speed or high speed connections.

2. In a controller for two speed A. C. motors, the combination with means to establish slow speed connections and high speed connections, including a master controller tending to effect establishment of such connections sequentially, of means affording a time element incident to establishment of slow speed connections whereby said master controller may be moved through its slow speed position and to its high speed position for establishment of high speed connections without establishment of slow speed connections.

3. In a controller for two speed A. C. motors, the combination with means to establish slow speed and high speed connections, including a master controller operable from a neutral position to slow speed and high speed positions sequentially for establishment of slow speed and high speed connections sequentially, of means associated with the former means to insure against establishment of slow speed connections upon continuous movement of said master controller from neutral position to high speed position.

4. In a controller for two speed A. C. motors, the combination with a master controller, of means controlled thereby to establish slow speed and high speed connections either sequentially or selectively for starting and accelerating the controlled motor, the latter means including means insuring upon decelerating operation of the master controller, establishment of slow speed connections prior to interruption of high speed connections.

5. In a controller for two speed A. C. motors the combination with means to establish slow speed and high speed connections whereby the motor may be controlled thereby for acceleration and deceleration, of means associated with the former means to insure establishment of slow speed connections prior to interruption of high speed connections for deceleration.

6. In a controller for two speed A. C. motors the combination with separate slow speed and high speed switches, of control means therefor to effect operation thereof progressively or operation of said high speed switch independently of said slow speed switch, the latter means including means insuring a time element incident to operation of said slow speed switch.

7. In a controller for two speed A. C. motors, the combination with separate slow speed and high speed switches of control means therefor to effect operation thereof progressively or operation of said high speed switch independently of said slow speed switch, the latter means including a relay normally positioned to arrest operation of said high speed switch and responsive to render the high speed switch responsive and to effect release of said slow speed switch and a second relay normally positioned to arrest operation of said slow speed switch and responsive to render said slow speed switch responsive but being subject to control by the former relay to be arrested by response thereof.

8. In a controller for two speed A. C. motors, the combination with separate slow speed and high speed switches, of control means therefor to effect operation thereof progressively or operation of said high speed switch independently of said slow speed switch, the latter means including a relay having normally engaged contacts included in the energizing circuit of said slow speed switch and normally disengaged contacts included in the energizing circuit of said high speed switch and a second relay having normally disengaged contacts included in the energizing circuit of said slow speed switch and having its own energizing circuit completed through the normally engaged contacts of the first mentioned relay.

9. In a controller for two speed A. C. motors, the combination with separate electro-responsive switches for controlling the slow speed and high speed connections of the controlled motor, of means to control said switches including a relay having normally engaged contacts included in the energizing circuit of said slow speed switch and normally disengaged contacts included in the energizing circuit of said high speed switch, a second relay under the control of said normally engaged contacts of the former relay and having normally disengaged contacts included in the energizing circuit of said slow speed switch whereby said switches may be caused to respond sequentially or selectively for starting and accelerating the controlled motor, the aforementioned means further including means for maintaining the high speed switch energized independently of the first mentioned relay and subject to de-energization by closure of said slow speed switch whereby in deceleration the high speed connections are maintained until establishment of slow speed connections.

10. In a controller for two speed A. C. motors the combination with separate electro-responsive switches for establishing slow speed and high speed connections for the controlled motor, of a transfer relay controlling said switches, a second relay under the control of said transfer relay to render said slow speed switch responsive subject to a time element, said second relay being subject to control by said slow speed switch for release thereof upon response of said slow speed switch and an accelerating switch under the control of said second relay to be rendered responsive upon release of the latter.

11. In a controller for two speed A. C. motors, in combination, separate electro-responsive switches for controlling the high and slow speed motor connections, control relays for said switches respectively, each of said relays normally interrupting the energizing circuit of its respective switch and each relay being subject to de-energization upon response of its respective switch, accelerating switches respectively controlled by said relays to be rendered responsive upon release of the latter and means for controlling said switches through the medium of said relays.

12. In a controller for two speed A. C. motors, in combination, separate electro-responsive switches for controlling the high and slow speed motor connections, control relays for said switches respectively, each of said relays normally interrupting the energizing circuit of its respective switch and each relay being subject to de-energization upon response of its respective switch, accelerating switches respectively controlled by said relays to be rendered responsive upon release of the latter and means for controlling said switches through the medium of said relays, said means including a transfer relay having normally engaged contacts included in the energizing circuits of said slow speed switch and its respective relay and having normally disengaged contacts included in the energizing circuits of said high speed switch and its respective relay.

In witness whereof, I have hereunto subscribed my name.

HARRISON P. REED.